United States Patent
Prais (10) Patent No.: US 10,900,474 B2
(45) Date of Patent: Jan. 26, 2021

(54) SYSTEM AND METHOD FOR HAND PUMP FAUCET

(71) Applicant: Eugene R. Prais, West Milford, NJ (US)

(72) Inventor: Eugene R. Prais, West Milford, NJ (US)

(*) Notice: Subject to any disclaimer, the term of this patent is extended or adjusted under 35 U.S.C. 154(b) by 0 days.

(21) Appl. No.: 16/454,721

(22) Filed: Jun. 27, 2019

(65) Prior Publication Data

US 2020/0003194 A1 Jan. 2, 2020

Related U.S. Application Data

(60) Provisional application No. 62/691,185, filed on Jun. 28, 2018.

(51) Int. Cl.
*E03C 1/04* (2006.01)
*F04B 9/14* (2006.01)
*F16K 11/00* (2006.01)

(52) U.S. Cl.
CPC .............. *F04B 9/14* (2013.01); *E03C 1/04* (2013.01); *F16K 19/006* (2013.01)

(58) Field of Classification Search
USPC .................................................. 137/625.17
See application file for complete search history.

(56) References Cited

U.S. PATENT DOCUMENTS

| | | | |
|---|---|---|---|
| 3,780,758 A | 12/1973 | DeVries | |
| 4,226,260 A | 10/1980 | Schmitt | |
| 4,793,375 A | 12/1988 | Marty | |
| 4,821,765 A | 4/1989 | Iqbal et al. | |
| 4,987,926 A * | 1/1991 | Simmons | E03B 9/20 137/625.4 |
| 6,283,328 B1 | 9/2001 | Vojvodic | |
| 2005/0005977 A1* | 1/2005 | Bolgar | F16K 11/074 137/625.41 |
| 2007/0068583 A1 | 3/2007 | Johnson et al. | |
| 2018/0031134 A1 | 2/2018 | Yang | |

* cited by examiner

*Primary Examiner* — John Fox
(74) *Attorney, Agent, or Firm* — Meagher Emanuel Laks Goldberg & Liao, LLP (57) ABSTRACT

Generally disclosed herein are unique mechanical elements implemented in a system and method to convert authentic hand water pumps into functioning water faucets or fabricate the functioning water faucet to simulate an authentic hand water pump. The operating principles and feel of a typical lever faucet have been replicated on the hand pump through use of a cartridge valve connected to a coupling clevis. The pump handle can be lifted up to turn water on and control the flow rate and can simultaneously be partially rotated clockwise or counterclockwise to select water temperature.

20 Claims, 8 Drawing Sheets

SYSTEM AND METHOD FOR HAND PUMP FAUCET

CROSS-REFERENCE TO RELATED APPLICATIONS

This application claims priority to provisional application 62/691,185, filed Jun. 28, 2018, which is herein incorporated by reference in its entirety.

FIELD OF THE INVENTION

Embodiments of the present invention relate generally to water dispensing systems and, more particularly, to a systems and methods for converting an authentic hand water pump into a functioning water faucet as well as fabricating the functioning water faucet to simulate an authentic hand water pump.

BACKGROUND OF THE INVENTION

In home and commercial décor, primitive European and early American design have been popularized. As a ubiquitous part of kitchen, bathroom, and restaurant/bar front end work centers, water faucets have become one focal point of such design and function. Specifically, the aim has been to bring old fashioned hand water pump styling to these modern functional areas. A perusal of offerings from the major faucet manufacturers demonstrates this design trend. Hand water pumps are also frequently found in designs of outside spaces, especially gardening and landscape features. Further, commercial and residential property owners are using functioning hand pumps in cabins, lakefront homes, and other facilities where private water wells serve as primary water supplies and access to those wells for additional supply lines is practical. However, there is a gap created by the need for practical functionality, installation, and service compared to the strong appeal of authentic primitive/colonial design elements. As such, there is a need for authentic hand water pumps with modern era functionality.

SUMMARY OF THE INVENTION

Various deficiencies in the prior art are addressed by systems, methods, architectures, mechanisms and/or apparatus configured for a hand pump faucet. The hand pump faucet includes a pump housing and a pump handle configured to be tilted away from the pump housing to allow for water flow and rotated at least partially around the pump housing to allow for water temperature adjustment. The hand pump faucet further includes a cartridge valve contained within the pump housing and coupled to the pump handle, the cartridge valve configured to control the water flow and the water temperature adjustment based on movement of the pump handle. The hand pump faucet also includes a coupling device coupled between the pump handle and the cartridge valve, the coupling device configured to translate the tilting and the rotation of the pump handle to the cartridge valve. Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions.

Moreover, some statements may apply to some inventive features but not to others. Those skilled in the art and informed by the teachings herein will realize that the invention is also applicable to various other technical areas or embodiments.

The various embodiments generally disclosed herein introduce unique mechanical elements and design to convert authentic hand water pumps into functioning water faucets. Further, these elements may be used in the fabrication of a new faucet seeking to replicate the use of an authentic hand pump. The operating principles and feel of a modern lever faucet have been merged with the construction and workings of the hand pump. The pump handle can be lifted up to turn water on and control the flow rate, and can simultaneously be partially rotated clockwise or counterclockwise to select water temperature.

Manufacturing of the parts may be utilized through conventional and practical means with most parts suitable for injection molding. Embodiments of the invention utilize a cartridge valve as a core element of water control. Both of these factors maintain reasonable manufacturing costs.

Service can be achieved in a manner similar to lever faucets where simple disassembly allows repair or replacement of the cartridge valve or other elements when necessary. With dimensional modifications of only a few components, the conversion to a hand pump faucet can be applied to many of the variants of hand water pump offerings. The hot and cold water supply lines may be connected by standard flexible tubes and fittings routed through the pump base.

Figure 1:
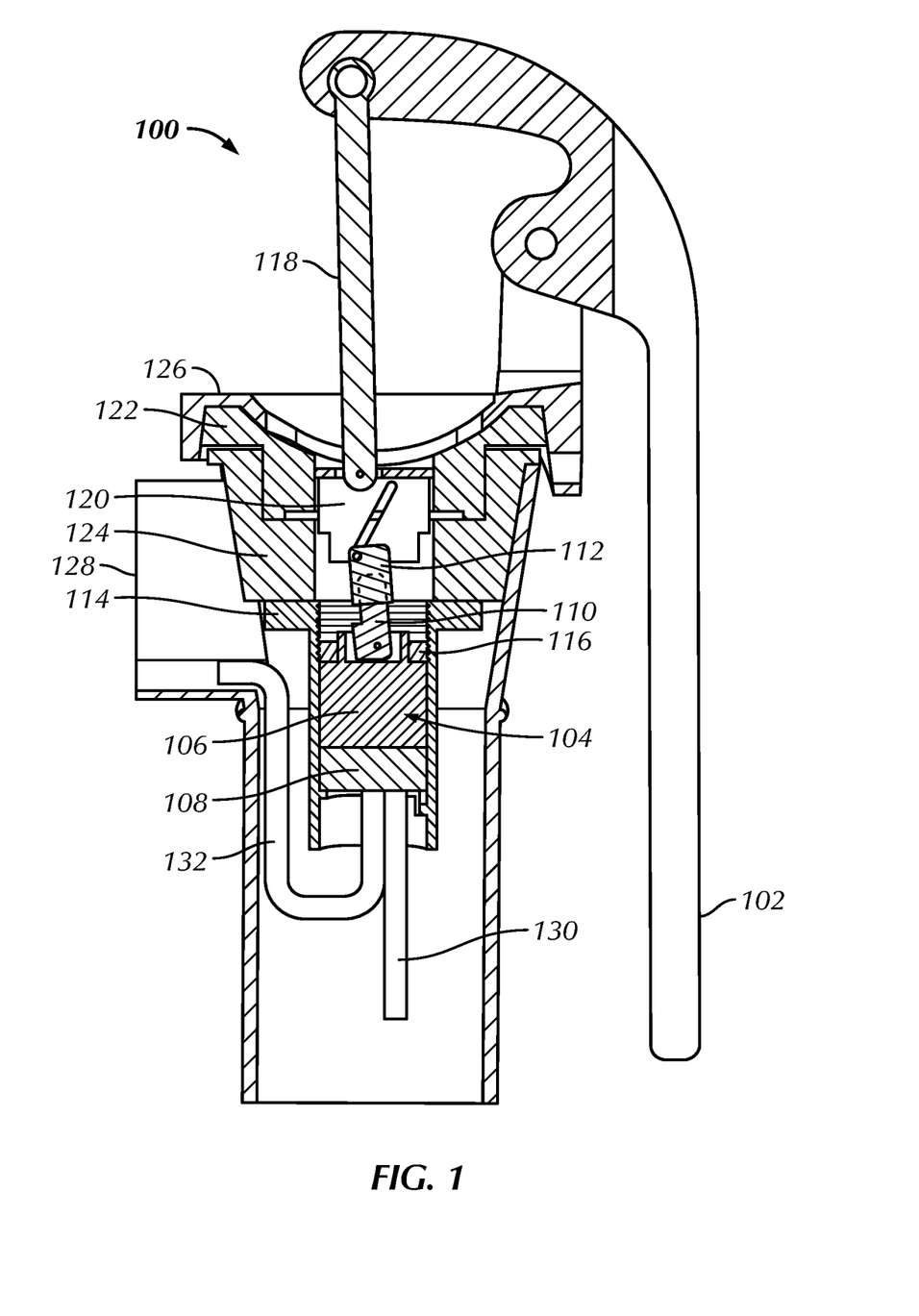
FIG. 1 depicts a schematic diagram of a hand pump faucet according to an embodiment of the present invention.

FIG. 1 depicts a schematic diagram of a hand pump faucet 100 according to an embodiment of the present invention. The hand pump faucet 100 includes an elongated pump handle 102 and a cartridge valve 104 including a valve body 106 and valve lever 110. The cartridge valve is coupled to a valve plate 108 and a valve lever coupling 112. The cartridge valve 104 is housed in a cartridge holder 114 to provide for mounting and retention. The cartridge holder 114 may include a retainer ring 116, which is a threaded ring that engages thread in the cartridge holder 114 to retain the cartridge valve 104 in place. The handle 102 is connected to the cartridge valve 104 via a connecting rod 118 and a coupling clevis 120. The coupling clevis is connected to the valve lever coupling 112 of the cartridge valve 104.

The hand pump faucet 100 further includes an upper bushing 122 and a lower bushing 124 around the coupling clevis 120. The upper bushing 122 is secured to a pump top 126 and the lower bushing is secured to a pump housing 128. The upper bushing 122 is configured for rotation against and retention to the lower bushing 124, which acts as a bearing for the upper bushing 122. The lower bushing 124 is also configured to position the cartridge valve holder 114. The pump housing 128 and pump top 126 form an outer portion of the hand pump faucet 100 and may be modified with screw holes if needed. The pump handle 102 is additionally connected to the pump top 126. This connection along with the connecting rod 118 allows the pump handle 102 to have a range of motion. The upper bushing 122, lower bushing 124, and cartridge holder 114 may be generally self-contained. Only slight modifications to the upper bushing 122, lower bushing 124, or cartridge holder 114 may be needed to allow for adaptation to a variety of authentic hand pumps.

The hand pump faucet 100 further includes one or more supply tubes 130 and a discharge line 132 connected through the valve plate 108 to the valve body 106 of the cartridge valve 104. The supply tubes 130 provide hot and cold water from a water source and the discharge line 132 provides the flow of hot or cold water to be output from the faucet 100. The cartridge valve 104, as mentioned earlier, may be a standard faucet valve module to allow for water flow from the supply tubes 130 to the discharge line 132. The valve plate 108 serves as an attachment point for the supply tubes 130 and the discharge line 132 and connects them to the valve body 106. The valve lever 110 actuates water on or off and rotates for temperature control.

The pump handle 102 may be constructed out of cast iron or cast aluminum and may be connected to the connecting rod 118 via a pin. The connecting rod 118 may be constructed out of cast aluminum, acrylonitrile butadiene styrene (ABS), or polycarbonate and may be connected to the coupling clevis 120 via a pin. The coupling clevis 120 may be constructed out of ABS, polycarbonate, nylon, or cast aluminum and may be connected to the valve lever coupling 112 via a pin in a clevis slot. The valve lever coupling 112 may be constructed out of ABS, polycarbonate, or nylon and may be connected to the cartridge valve lever 110 via a machine screw to the cartridge valve 104. The cartridge holder 114 may be constructed out of ABS, polycarbonate, or nylon and may be connected to the lower bushing 124 via machine screws. The lower bushing 124 may be constructed out of ABS, polycarbonate, or nylon and may be connected to the pump housing 128 via machine screws. The upper bushing 122 may be constructed out of ABS, polycarbonate, or nylon and may be connected to the pump top 126 via machine screws. It is to be noted these materials and connections are nonlimiting examples and may differ depending on design choices and construction of the hand pump faucet 100.

In a modern faucet, a handle is typically attached directly to a cartridge lever of a cartridge valve. The handle is tilted to turn water on or off and then rotated to select temperature. However, the pump handle 102 of the hand pump faucet 100 has a longer range of motion than a typical faucet handle in order to be able to pump water from a well. Given the length and weight of the pump handle 102, attaching it directly to the cartridge valve 104 would not translate to the longer strokes needed for pumping water. Additionally, since the pump handle 102 is typically cast iron, such significant weight would simply close the cartridge valve 104 when a user releases the pump handle 102. Importantly, in a working hand pump 100, the motion of the connecting rod 118 is one of both translation and rotation.

Embodiments of the present invention address these issues for an authentic look and feel while maintaining function of a modern faucet. These issues are addressed by including a coupling device connected between the connecting rod 118 and the cartridge valve 104. In FIGS. 1-7, the coupling device is the coupling clevis 120.

Because of the angled slot arrangement, the coupling clevis 120 requires a longer travel of the pump handle 102 to actuate the valve lever 110 to a full on position. The coupling clevis 120 travels through a bore diameter in the lower bushing 124. The diameter of the coupling clevis 120 and lower bushing 124 may be matched to provide different levels of sliding friction to offset the weight of the pump handle 102, depending on design considerations. In alternative embodiments, an O-ring or seal could be fitted to either diameter to control friction. This link-slider arrangement also allows the pump handle 102 to retain and utilize a pin connection to the pump top 126. This arrangement preserves authentic look and operation.

Figure 2A:
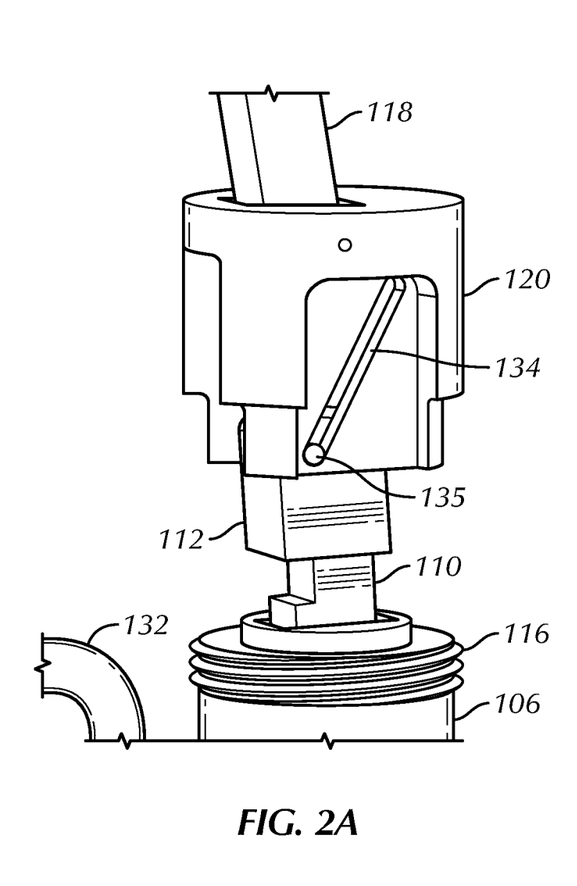
FIG. 2(a) depicts a perspective view of a coupling clevis according to an embodiment of the present invention.
Figure 2B:
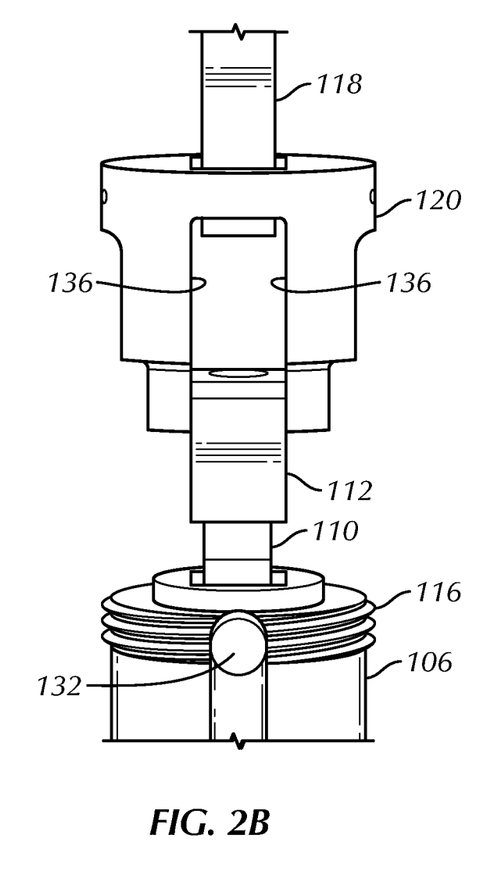
FIG. 2(b) depicts an alternative view of the coupling clevis according to an embodiment of the present invention.

FIGS. 2(a) and 2(b) depicts perspective views of the coupling clevis 120 according to embodiments of the present invention. The coupling clevis 120 has two key features which control motion of the valve lever coupling 112, and thus the valve lever 110 of the cartridge valve 104. The first feature is an angled cam slot 134, which engages the valve lever coupling 112 via a pin 135. As the coupling clevis 120 moves vertically in the bore of the lower bushing 124, the slot 134 drives the valve lever coupling pin 135 to rotate the valve lever 110 to an on or off position.

Figure 3:
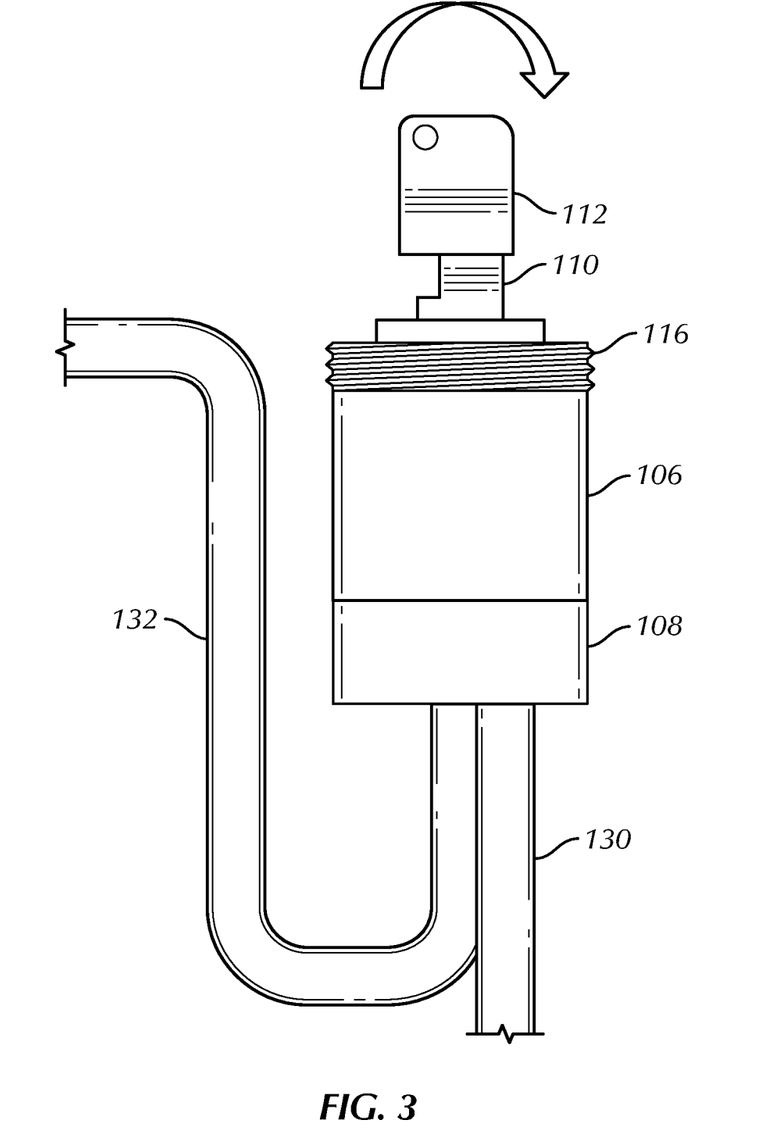
FIG. 3 depicts a diagram illustrating an axis of rotation for on and off positions according to an embodiment of the present invention.
Figure 4:
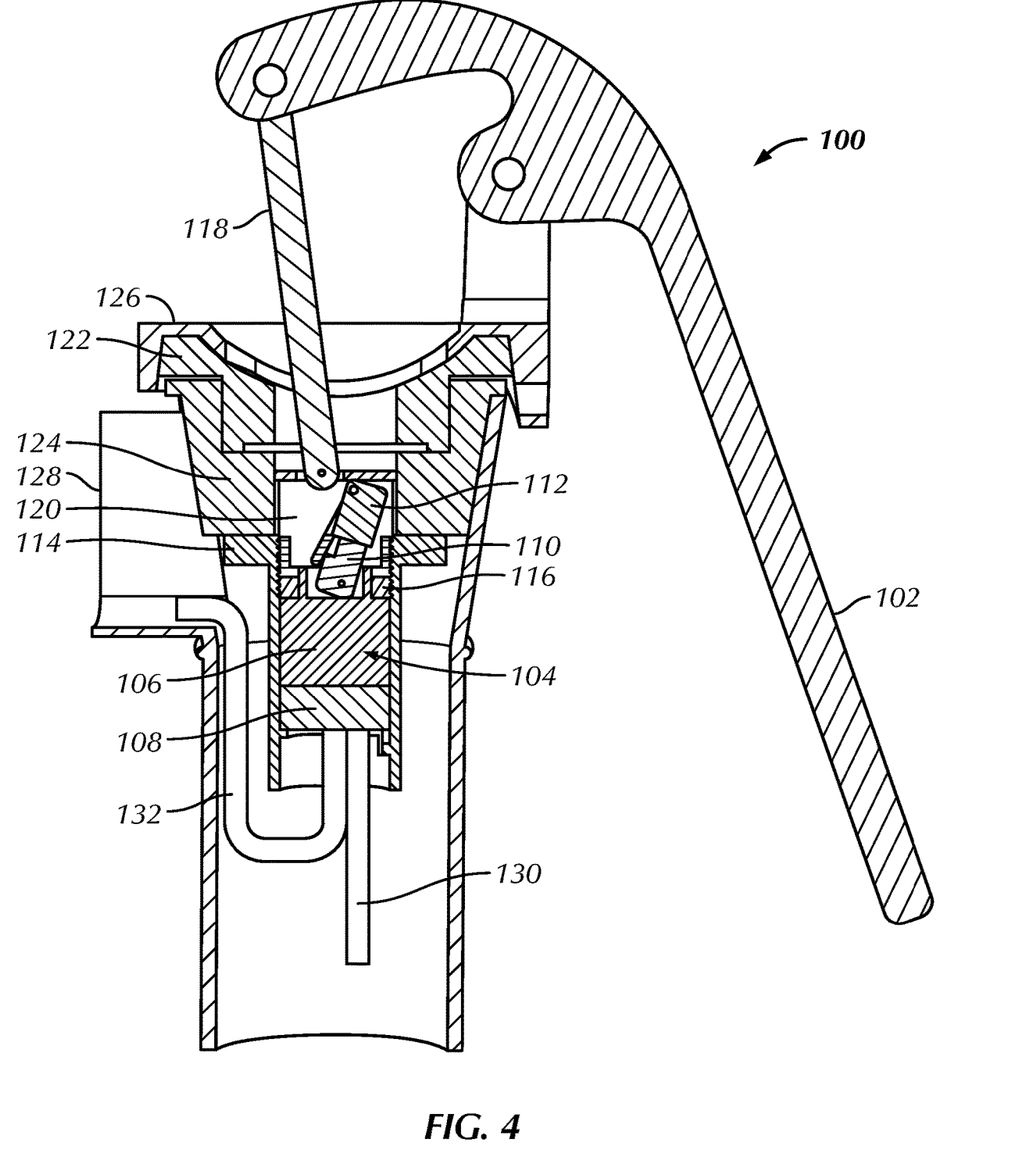
FIG. 4 depicts a diagram of a hand pump faucet in an on position according to an embodiment of the present invention.
Figure 5:
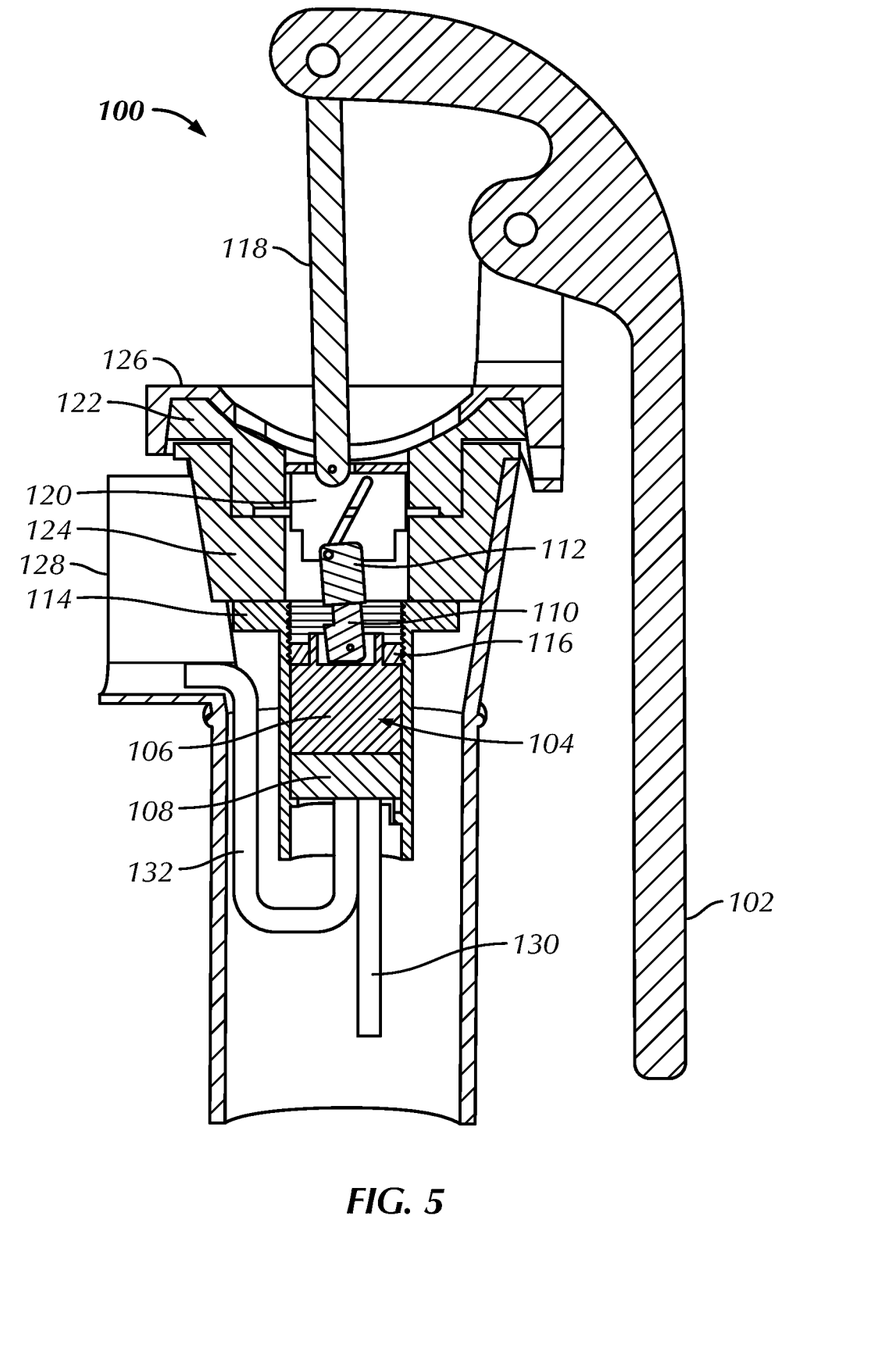
FIG. 5 depicts a diagram of a hand pump faucet in an off position according to an embodiment of the present invention.

FIG. 3 depicts an axis of rotation for on and off positions according to an embodiment of the present invention. FIG. 4 depicts the hand pump faucet 100 in an on position according to an embodiment of the present invention, which shows the coupling clevis 120 in the lowest position and the angled slot 134 urging the valve lever coupling 112 to its on position. FIG. 5 depicts the hand pump faucet 100 in an off position according to an embodiment of the present invention, which shows the pump handle 102 pushed forward to stop water from flowing out of the discharge line 132. When the pump handle 102 is moved to the nearly vertical position, the coupling clevis 120 is raised to its highest position, which causes the angled slot 134 to drive the valve lever coupling pin 135 to rotate the valve lever 110 to an off position.

Figure 6:
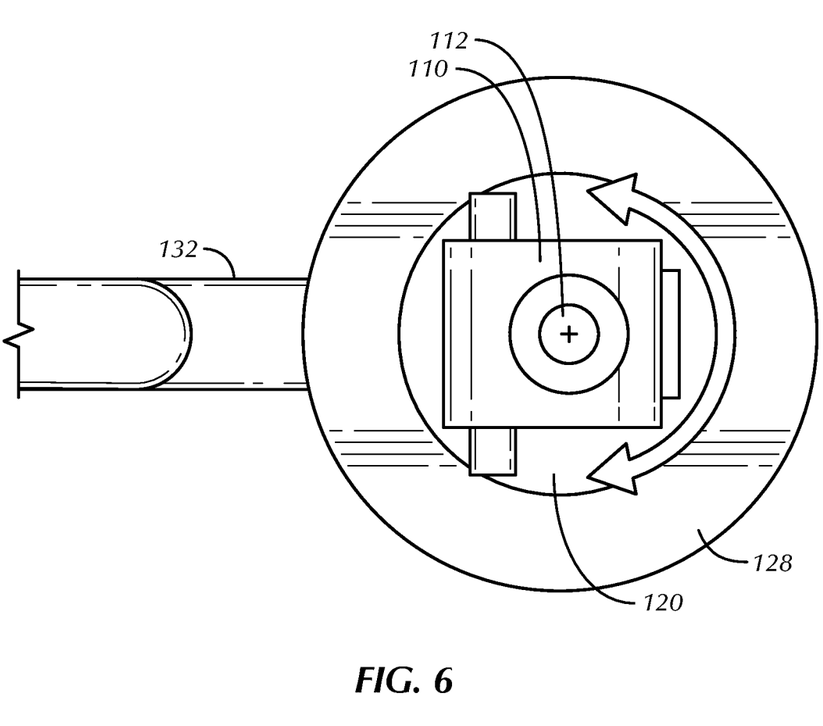
FIG. 6 depicts a diagram illustrating an axis of rotation for temperature according to an embodiment of the present invention.

Referring back to FIGS. 2(a) and 2(b), a second feature in the coupling clevis 120 is a main clevis feature 136. As the pump handle 102 is rotated by a user, the connecting rod 118 rotates the coupling clevis 120 within the bore. The main clevis feature 136 then engages the valve lever coupling 112 to rotate the valve lever 110 on its temperature control axis to select hot or cold water. FIG. 6 depicts an axis of rotation for temperature control according to an embodiment of the present invention.

For rotation during temperature control, neither the valve lever 110 nor the cartridge valve 104 itself are robust enough to directly couple the pump handle 102 to the valve lever 110. Additionally, the pump top 126 provides a mounting for the pump handle 102, but may be rigidly fixed to the pump housing 128. The challenge then becomes relieving the cartridge valve 104 of substantial load bearing and providing rotation for temperature control while allowing for simultaneous motions for water on and off flow control, as described above. Embodiments of the present invention address these constraints via the upper bushing 122 and lower bushing 124 arrangement along with the coupling clevis 120 housed within.

Figure 7A:
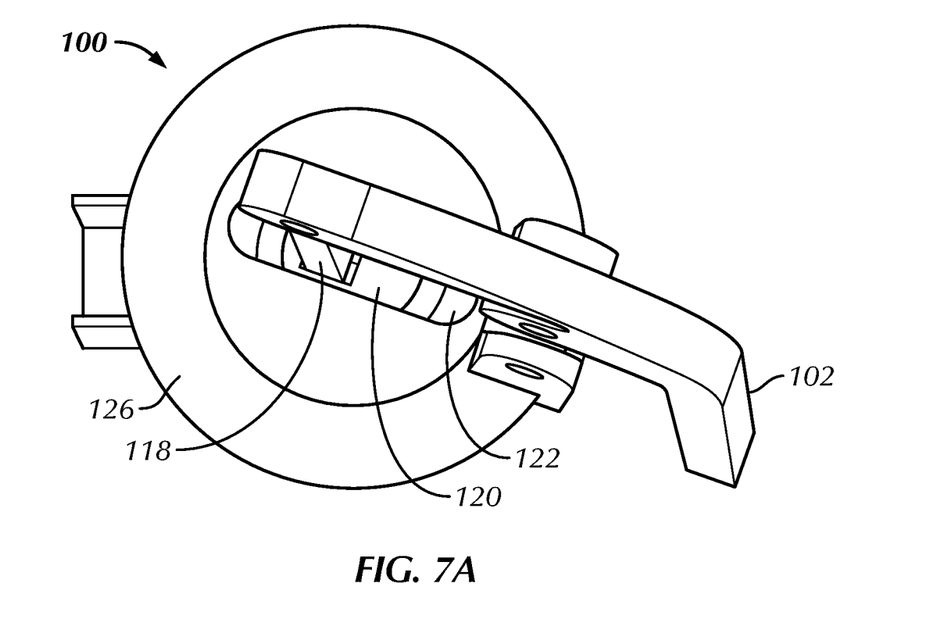
FIG. 7(a) depicts a diagram of a hand pump faucet illustrating cold temperature adjustment according to an embodiment of the present invention.
Figure 7B:
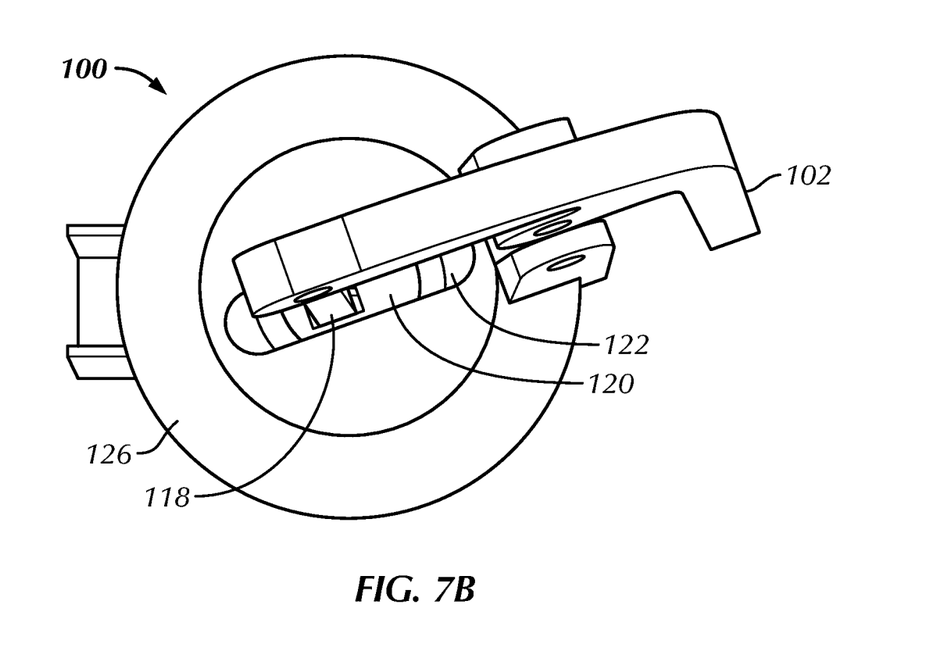
FIG. 7(b) depicts a diagram of a hand pump faucet illustrating hot temperature adjustment according to an embodiment of the present invention.

FIGS. 7(a) and 7(b) depict the hand pump faucet 100 adjusting for cold and hot water, respectively, according to an embodiment of the present invention. FIG. 7(a) depicts the pump handle 102 rotated slightly to the right or clockwise for cold water and FIG. 7(b) depicts the pump handle 102 rotated slightly to the left or counterclockwise for hot water. The further right or left the pump handle 102 is rotated, the colder or hotter the temperature of the water will be. One or more stoppers, for instance, rubber stoppers, may be included to prevent full rotation of the pump handle 102 and allow for a maximum and minimum temperature for the water.

The upper bushing 122 and lower bushing 124 provide rotational motion between the pump top 126 and pump housing 128. The coupling clevis 120 transfers torque to the valve lever 110 to adjust temperature and drives the valve lever 110 to tilt throughout simultaneous rotation.

As described above, the coupling clevis 120 acts as a connection between the connecting rod 118 and the valve lever coupling 112. The coupling clevis 120 translates both tilting and rotation of the valve lever 110 based on motions from the pump handle 102. The coupling clevis 120 may include a cam slot 134 provided for on and off motion of the pump handle 102 as well as a channel to control rotation of the valve lever coupling 112. The cam slot 134 may drive the valve lever 110 to tilt during simultaneous rotation. The connecting rod 118 links the coupling clevis 120 with the pump handle 102. The valve lever coupling 112 fits on the valve lever 110 and interfaces with the cam slot 134 via a pin. The coupling clevis 120 translates vertically in a bore in the lower bushing 124. FIG. 6 depicts the coupling clevis 120 engaging the valve lever coupling 112 in the hand pump faucet 100 according to an embodiment of the present invention.

Figure 8:
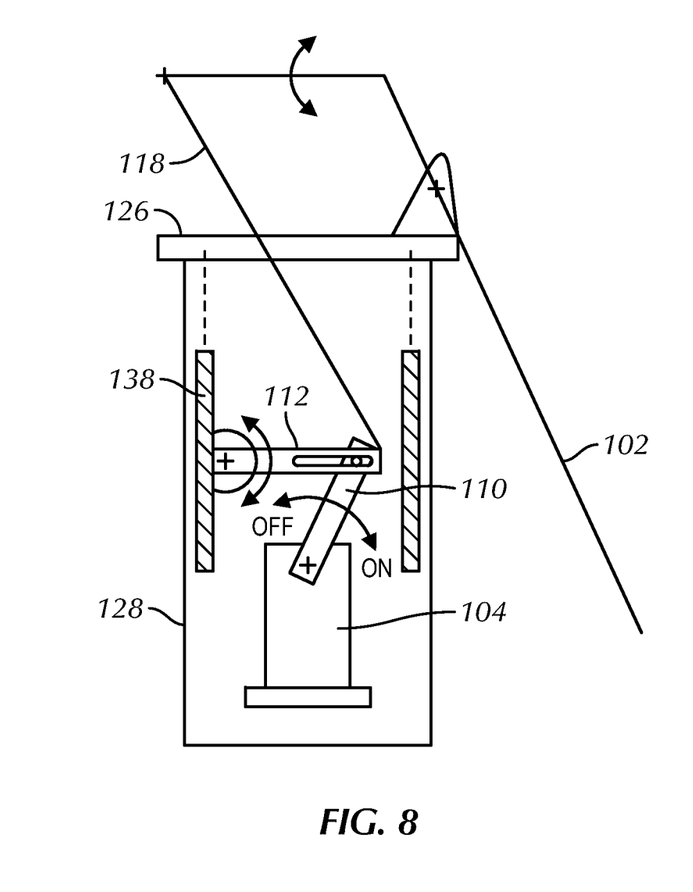
FIG. 8 depicts a diagram of an alternative hand pump faucet according to an embodiment of the present invention.

FIG. 8 depicts a diagram of an alternative hand pump faucet according to an embodiment of the present invention. Instead of a coupling clevis 120, the coupling device between the connecting rod 118 and valve lever coupling 112 is a lever sleeve 138. The lever sleeve 138 functions similarly to the coupling clevis 120 as described earlier. The lever sleeve 138 is stationary vertically while the valve lever coupling 112 is driven to rotate the valve lever 110 to an on or off position. The pump handle 102 and thus the connecting rod 118 imparts a rotation to the valve lever coupling 112 about its axis. Further, as the lever sleeve 138 rotates with the pump top 126, the lever sleeve 138 engages the valve lever coupling 112 to rotate the valve lever 110 on its temperature control axis to select hot or cold water.

Figure 9:
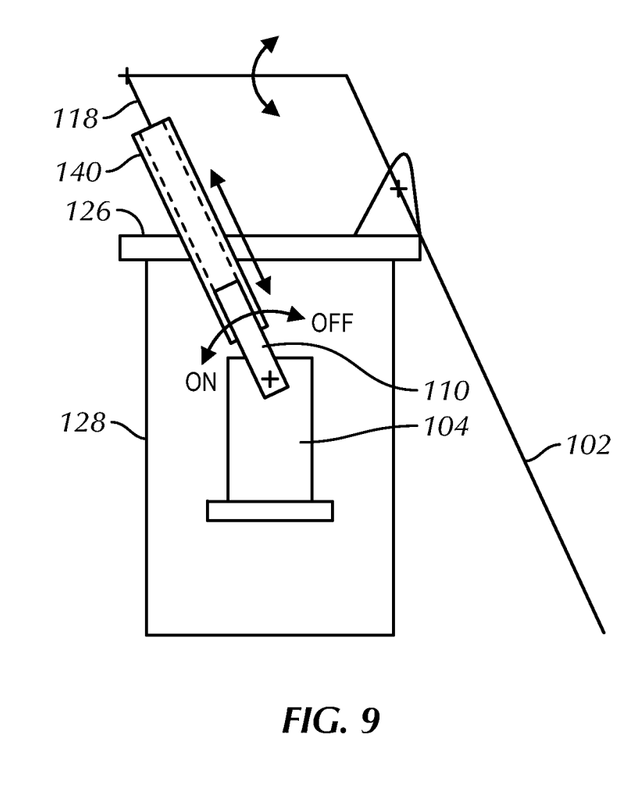
FIG. 9 depicts a diagram of another alternative hand pump faucet according to an embodiment of the present invention.

FIG. 9 depicts a diagram of another alternative hand pump faucet according to an embodiment of the present invention. Instead of a coupling clevis 120, the coupling device is a splined telescoping tube 140 connected to the valve lever 110. A connecting rod 118 and valve lever coupling 112 may or may not be included depending on design choices. The telescoping tube 140 functions similarly to the coupling clevis 120 as described earlier. As the pump handle 102 moves, the telescoping tube 140 is driven to rotate the valve lever 110 to an on or off position. Further, as the telescoping tube 140 rotates with the pump top 126, the telescoping tube 140 engages the valve lever 110 to rotate the valve lever 110 on its temperature control axis to select hot or cold water.

Thus, introduced herein are various embodiments for conversion of an authentic hand pump into a functional faucet or fabricating the functioning water faucet to simulate an authentic hand water pump. The operating principles and feel of a typical lever faucet have been replicated on the hand pump through use of at least a cartridge valve connected to a coupling device. The pump handle can be lifted up to turn water on and control the flow rate and can simultaneously be partially rotated clockwise or counterclockwise to select water temperature.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:
1. A hand pump faucet comprising:
a pump housing;

a pump handle configured to be tilted away from the pump housing to allow for water flow and rotated at least partially around the pump housing to allow for water temperature adjustment;

a cartridge valve contained within the pump housing and coupled to the pump handle, the cartridge valve configured to control the water flow and the water temperature adjustment based on movement of the pump handle; and a coupling clevis coupled between the pump handle and the cartridge valve, the coupling clevis configured to translate the tilting and the rotation of the pump handle to the cartridge valve.

2. The hand pump faucet of claim 1, further comprising a pump top connected to the pump handle and pump housing.

3. The hand pump faucet of claim 2, further comprising an upper bushing and a lower bushing around the coupling clevis, the upper bushing and lower bushing configured to provide rotational motion between the pump top and pump housing.

4. The hand pump faucet of claim 1, further comprising one or more supply tubes to provide water and a discharge line to output the water.

5. The hand pump faucet of claim 1, wherein the coupling clevis comprises a cam slot and clevis feature.

6. The hand pump faucet of claim 1, further comprising a cartridge holder to house the cartridge valve.

7. The hand pump faucet of claim 1, wherein the cartridge valve comprises a valve plate configured to attach one or more supply tubes and a discharge line to the cartridge valve.

8. The hand pump faucet of claim 1, wherein the cartridge valve comprises a valve lever configured to actuate the water flow and rotate for the water temperature adjustment.

9. The hand pump faucet of claim 1, further comprising a connecting rod to couple the coupling clevis to the pump handle.

10. A method for operating a hand pump faucet, the hand pump faucet including a pump handle, a cartridge valve, and a coupling clevis connected therebetween, the method comprising:

tilting the pump handle to allow for water flow, wherein the tilt of the pump handle is translated via the coupling clevis to the cartridge valve and the water flow is actuated via the cartridge valve based on the translated tilt of the pump handle; and rotating the pump handle to allow for water temperature adjustment, wherein the rotation of the pump handle is translated via the coupling clevis to the cartridge valve and the water temperature is adjusted via the cartridge valve based on the translated rotation of the pump handle.

11. The method of claim 10, wherein the pump handle is rotated clockwise to lower the water temperature and rotated counterclockwise to raise the water temperature.

12. The method of claim 10, further comprising outputting water via a discharge line.

13. A hand pump faucet comprising:

a pump housing;

a pump handle configured to be tilted away from the pump housing to allow for water flow and rotated at least partially around the pump housing to allow for water temperature adjustment;

a cartridge valve contained within the pump housing and coupled to the pump handle, the cartridge valve configured to control the water flow and the water temperature adjustment based on movement of the pump handle; and a coupling device coupled between the pump handle and the cartridge valve, the coupling device configured to translate the tilting and the rotation of the pump handle to the cartridge valve.

14. The hand pump faucet of claim 13, further comprising a pump top connected to the pump handle and pump housing.

15. The hand pump faucet of claim 14, further comprising an upper bushing and a lower bushing around the coupling device.

16. The hand pump faucet of claim 14, further comprising an upper bushing and a lower bushing around the coupling device, the upper bushing and lower bushing configured to provide rotational motion between the pump top and pump housing.

17. The hand pump faucet of claim 13, wherein the coupling device comprises one of a coupling clevis, a lever sleeve, and a splined telescoping tube.

18. The hand pump faucet of claim 13, wherein the cartridge valve comprises a valve plate configured to attach one or more supply tubes and a discharge line to the cartridge valve.

19. The hand pump faucet of claim 13, wherein the cartridge valve comprises a valve lever configured to actuate the water flow.

20. The hand pump faucet of claim 13, further comprising a connecting rod to couple the coupling device to the pump handle.

* * * * *